United States Patent
Ono et al.

(10) Patent No.: US 8,768,161 B2
(45) Date of Patent: Jul. 1, 2014

(54) OPTICAL APPARATUS ACCESSORY AND OPTICAL APPARATUS

(71) Applicant: Canon Kabushiki Kaisha, Tokyo (JP)

(72) Inventors: Shuhei Ono, Utsunomiya (JP); Shigeki Sato, Utsunomiya (JP); Daisuke Fujiwara, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 14/024,808

(22) Filed: Sep. 12, 2013

(65) Prior Publication Data

US 2014/0072293 A1    Mar. 13, 2014

(30) Foreign Application Priority Data

Sep. 13, 2012  (JP) ................................. 2012-201267

(51) Int. Cl.
*G03B 17/00* (2006.01)
(52) U.S. Cl.
USPC .......................................................... 396/532
(58) Field of Classification Search
CPC ..................................................... G03B 17/14
USPC .................................. 396/532; 439/700, 289
See application file for complete search history.

(56) References Cited

U.S. PATENT DOCUMENTS

| | | | | |
|---|---|---|---|---|
| 5,021,812 A | * | 6/1991 | Kohno et al. | 396/532 |
| 2006/0216023 A1 | * | 9/2006 | Tokiwa et al. | 396/532 |
| 2013/0077956 A1 | * | 3/2013 | Imafuji et al. | 396/532 |

FOREIGN PATENT DOCUMENTS

| | | |
|---|---|---|
| JP | 02-103522 A | 4/1990 |
| JP | 05-055137 A | 3/1993 |
| JP | 2006-343510 A | 12/2006 |
| JP | 2007-101656 A | 4/2007 |
| JP | 2010-181431 A | 8/2010 |

* cited by examiner

*Primary Examiner* — Clayton E Laballe
*Assistant Examiner* — Noam Reisner
(74) *Attorney, Agent, or Firm* — Rossi, Kimms & McDowell LLP

(57) ABSTRACT

The optical apparatus accessory includes multiple terminal faces arranged in a direction of a relative movement for attachment to an optical apparatus and allowed to make contact with multiple terminal pins provided in the optical apparatus, and electric insulation portions provided between each two adjacent terminal faces. The multiple terminal faces are arranged at a same height, each of the electric insulation portions includes two adjacent-to-terminal potions respectively adjacent to the two adjacent terminal faces and a convex portion provided between the two adjacent-to-terminal potions and having a higher height than that of the two adjacent-to-terminal potions. The two adjacent-to-terminal potions have a height same as or lower than that of the terminal faces, and the convex portion has a height same as or higher than that of the terminal faces.

7 Claims, 6 Drawing Sheets

PRIOR ART

OPTICAL APPARATUS ACCESSORY AND OPTICAL APPARATUS

BACKGROUND OF THE INVENTION

The present invention relates to an optical apparatus accessory, such as an interchangeable lens, which is detachably attachable to an optical apparatus such as a camera.

Camera systems each including an interchangeable lens and a camera are configured such that multiple terminal pins provided in a mount portion of the camera make contact with multiple terminal faces provided in a mount portion of the interchangeable lens. Contact of each terminal pin with each terminal face corresponding thereto (that is, contact of paired terminal pin and face) among the multiple terminal pins and faces establishes electric connection between the camera and the interchangeable lens to supply power from the camera to the interchangeable lens and to send and receive various signals and information between the camera and the interchangeable lens.

The terminal pins and the terminal faces are arranged such that they are mutually slid by relative rotation of the camera and the interchangeable lens in order to attach their mounts to each other (couple them with each other by a bayonet coupling) and thereby the paired terminal pin and face make contact with each other in an attachment completed state.

However, in order to cause the terminal pin to make press contact with the terminal face, the terminal pin is held protrudedly and retractably in its axial direction and is biased with a spring in its protruding direction. Therefore, the terminal pin is not only movable in its axial direction but also allowed its displacement in its radial direction. In addition, repetition of attachment and detachment of the camera and interchangeable lens causes bend of the terminal pin or increase in diameter of a tip of the terminal pin due to abrasion. In these cases, in the attachment completed state, a contact failure occurs because the terminal pin does not make contact with the terminal face originally corresponding thereto, or a short circuit occurs because the terminal pin makes contact not only with the terminal face originally corresponding thereto but also with another terminal pin adjacent the originally corresponding terminal face. Thus, it is necessary to make a height of an electric insulation portion provided between the mutually adjacent terminal faces higher than that of the terminal face for preventing the terminal pin from moving onto the electric insulation portion or to increase a width of the electric insulation portion for preventing the terminal pin from simultaneously making contact with the mutually adjacent terminal faces.

Japanese Laid-Open No. 02-103522 discloses a configuration in which a height of one of two power supply terminals (terminal pins and terminal faces) included in each of multiple terminal pins provided in a camera and multiple terminal faces provided in an interchangeable lens is different from that of the other power supply terminal, that is, a configuration including a height difference. In this configuration, the one power supply terminal does not make contact with the other power supply terminal during relative rotation of the camera and interchangeable lens for attachment thereof, so that abrasion thereof is suppressed.

Furthermore, Japanese Laid-Open No. 2007-101656 discloses a configuration in which an attachment detection terminal (terminal pin or terminal face) for detecting attachment of an interchangeable lens to a camera is provided in each of multiple terminal pins provided in the camera and multiple terminal faces provided in the interchangeable lens and in which a distance between the attachment detection terminal and a terminal adjacent thereto with an electric insulation portion provided therebetween is set larger than that between other terminals.

However, the configuration disclosed in Japanese Laid-Open No. 02-103522 requires, as the height difference, a height that can prevent the one power supply terminal from making contact with the other power supply terminal during the relative rotation of the interchangeable lens, which increases a size of a terminal portion including the terminals in its height direction.

In addition, the configuration disclosed in Japanese Laid-Open No. 2007-101656 increases the distance between the attachment detection terminal and the terminal adjacent thereto, which increases a length of a terminal portion including the terminals in its terminal arrangement direction (that is, in a direction of the relative rotation of the interchangeable lens and camera).

BRIEF SUMMARY OF THE INVENTION

The present invention provides an optical apparatus accessory capable of suppressing a contact failure and a short circuit due to displacement or abrasion of a terminal pin without increasing a size of a terminal portion where multiple terminal faces are provided, and provides an optical apparatus to which the accessory is detachably attached.

The present invention provides as an aspect thereof an optical apparatus accessory detachably attachable to an optical apparatus by relative movement with the optical apparatus. The accessory includes multiple terminal faces arranged in a direction of the relative movement and allowed to make contact with multiple terminal pins provided in the optical apparatus to establish an electric contact between the accessory and the optical apparatus, and electric insulation portions provided between each two adjacent terminal faces among the multiple terminal faces. When a position in a direction from the terminal face toward the terminal pin in a state where attachment of the accessory and the optical apparatus is completed is defined as a height, the multiple terminal faces are arranged at a same height, each of the electric insulation portions includes two adjacent-to-terminal potions respectively adjacent to the two adjacent terminal faces and a convex portion provided between the two adjacent-to-terminal potions and having a higher height than that of the two adjacent-to-terminal potions, the two adjacent-to-terminal potions have a height same as or lower than that of the terminal faces, and the convex portion has a height same as or higher than that of the terminal faces.

The present invention provides as another aspect thereof an optical apparatus to which an optical apparatus accessory is detachably attachable by relative movement with the accessory. The accessory includes multiple terminal faces arranged in a direction of the relative movement and allowed to make contact with multiple terminal pins provided in the optical apparatus to establish an electric contact between the accessory and the optical apparatus, and electric insulation portions provided between each two adjacent terminal faces among the multiple terminal faces. When a position in a direction from the terminal face toward the terminal pin in a state where attachment of the accessory and the optical apparatus is completed is defined as a height, the multiple terminal faces are arranged at a same height, each of the electric insulation portions includes two adjacent-to-terminal potions respectively adjacent to the two adjacent terminal faces and a convex portion provided between the two adjacent-to-terminal potions and having a higher height than that of the two adjacent-to-terminal potions, the two adjacent-to-terminal potions have a height same as or lower than that of the terminal faces, and the convex portion has a height same as or higher than that of the terminal faces. The apparatus has a configuration which holds the multiple terminal pins such that each terminal pin is movable in a direction of protruding toward the terminal face and in an opposite direction thereto and which biases each terminal pin in the direction of protruding toward the terminal face.

Other aspects of the present invention will be apparent from the embodiments described below with reference to the drawings.

DETAILED DESCRIPTION OF THE EMBODIMENTS

Exemplary embodiments of the present invention will be described below with reference to the accompanied drawings.

Figure 1:
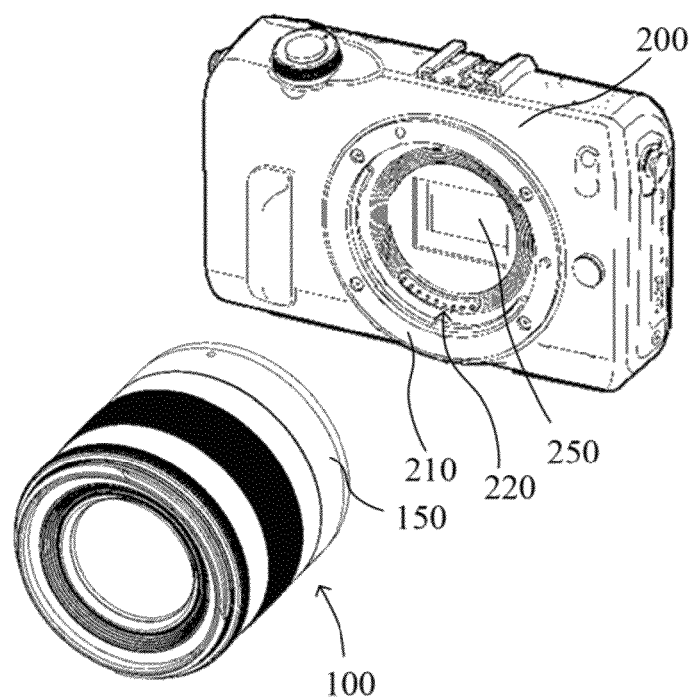
FIG. 1 is a perspective view of an interchangeable lens and a digital camera, which are each an embodiment of the present invention.

FIG. 1 shows an interchangeable lens 100 as an optical apparatus accessory and a digital camera body (hereinafter, simply referred to as a camera) 200 as an image pickup apparatus, which are each an embodiment of the present invention. Moreover, FIG. 2 shows a sectional configuration of the interchangeable lens 100.

The camera 100 is provided with a camera mount 210 corresponding to an apparatus mount portion on a front face of its body, and with an image sensor 250 such as a CMOS sensor or a CCD sensor at an innermost position of an exposure opening formed inside the camera mount portion 210.

On the other hand, the interchangeable lens 100 includes an image capturing optical system 140 constituted by multiple lens units and an aperture stop, and a lens barrel 150 housing the image capturing optical system 140. Reference character X in FIG. 2 denotes an optical axis of the image capturing optical system 140. A direction in which an optical axis extends is referred to as "an optical axis direction." The interchangeable lens 100 further includes a lens mount 110 corresponding to an accessory mount portion, which is attached to a rear end portion (image plane side end portion in the optical axis direction) of the lens barrel 150. In a state where a mount face having a ring shape of the lens mount 110 is brought into contact with a mount reference face having a ring shape of the camera mount 210, relatively rotating the interchangeable lens 100 and the camera 200 in a direction about the optical axis (hereinafter referred to as "an around-optical-axis direction") couples the lens mount 110 and the camera mount 210 by a bayonet coupling. In this way, the interchangeable lens 100 is detachably attached to the camera 200.

Figure 2:
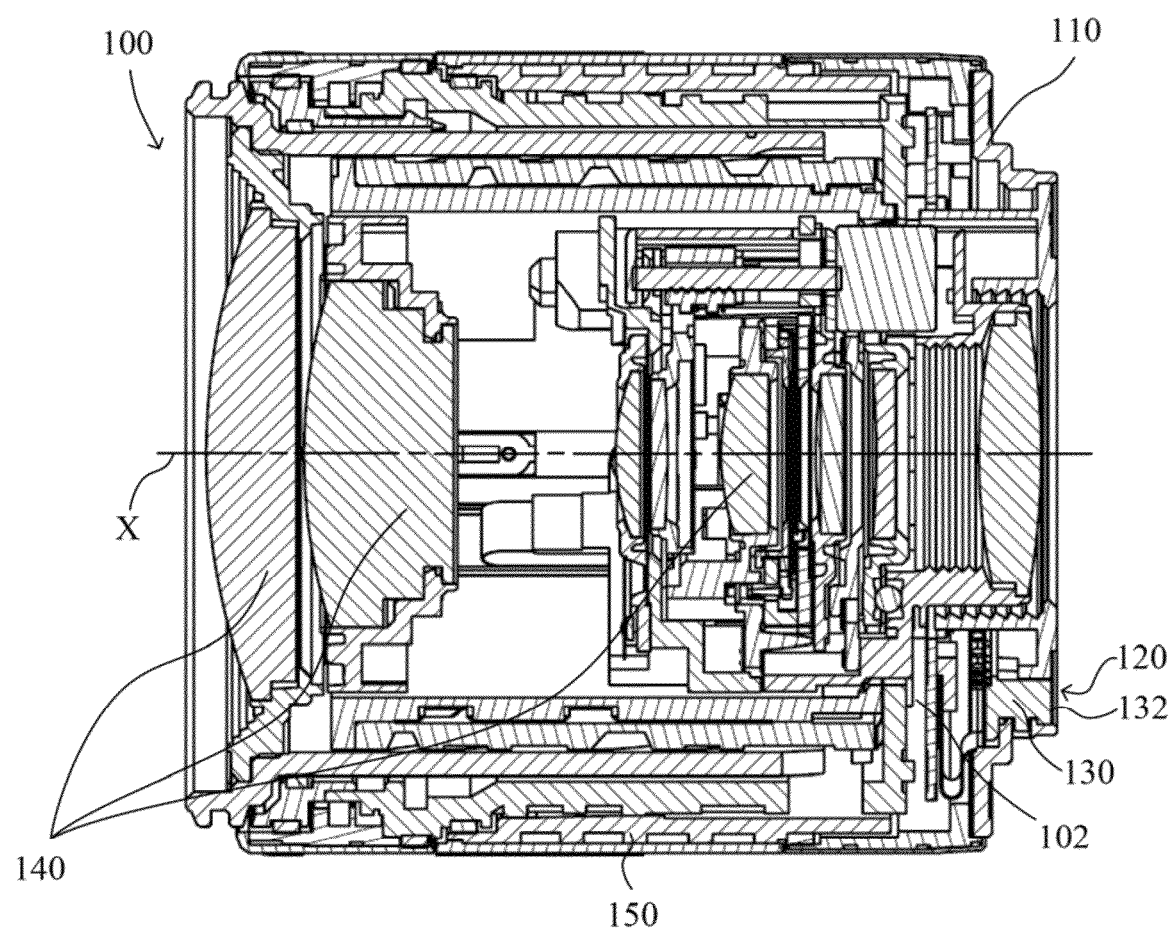
FIG. 2 is a sectional view of the interchangeable lens of the embodiment.
Figure 4:
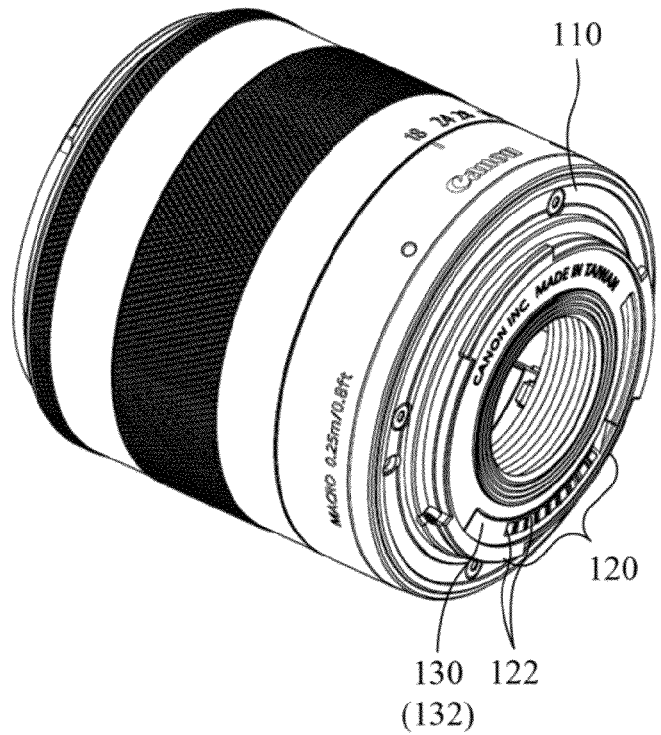
FIG. 4 is a perspective view of the interchangeable lens of the embodiment.

As shown in FIG. 2, a lens electric circuit 102 is provided inside the lens barrel 150 of the interchangeable lens 100. In addition, as shown in FIG. 4, a lens terminal portion 120 including multiple lens terminal faces 122 electrically connected to the lens electric circuit 102 is provided inside the lens mount 110 and further outside than a final lens unit of the image capturing optical system.

The lens terminal portion 120 includes the multiple lens terminal faces 122 facing rearward of the interchangeable lens 100 (that is, on an image plane side) and a lens terminal holder 130 holding the lens terminal faces 122. The lens terminal holder 130 is formed by using a plastic having an electric insulation property so as to extend in an arc shape in a direction of the relative rotation (that is, in the around-optical-axis direction) for the bayonet coupling between the interchangeable lens 100 and the camera 200. The direction of the relative rotation of the interchangeable lens 100 and the camera 200 is hereinafter also referred to as "a relative rotation direction." As shown in FIG. 2, the lens terminal holder 130 is fixed to the lens mount 110. The lens terminal faces 122 are arranged with predetermined distances thereamong so as to form a line along the arc shape on a terminal arrangement face 132 which is a rear end face of the lens terminal holder 130. A portion between each two lens terminal faces 122 adjacent to each other in the relative rotation direction in the lens terminal holder 130 forms an electric insulation portion that electrically insulates the two adjacent lens terminal faces 122.

Figure 3:
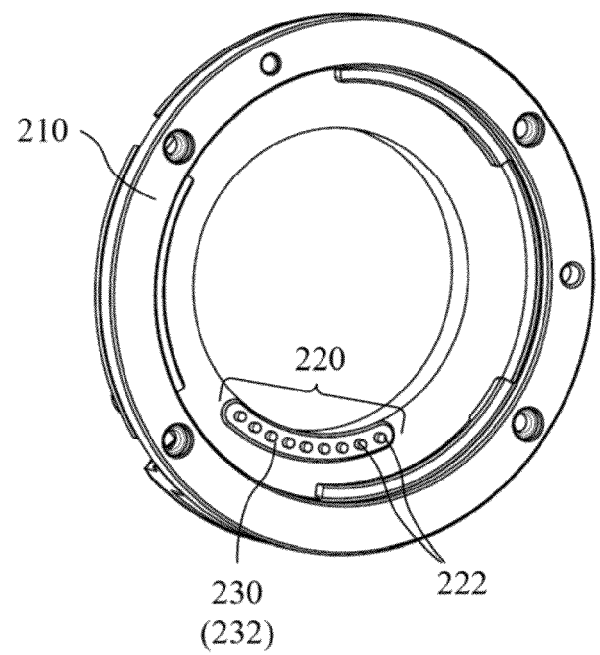
FIG. 3 is a perspective view of a camera terminal portion in the embodiment.

On the other hand, a camera electric circuit (not shown) is provided inside the camera 200. As shown in FIG. 3, a camera terminal portion 220 including multiple camera terminal pins 222 electrically connected to the camera electric circuit is provided inside the camera mount 210 and further outside than the exposure opening.

The camera terminal portion 220 includes the multiple camera terminal pins 222 whose tips extend forward (that is, toward an object side in the optical axis direction) of the camera 200, and a camera terminal holder 230 that holds the camera terminal pins 222. The camera terminal holder 230 is formed using a plastic having an electric insulation property so as to extend in an arc shape in the relative rotation direction for the bayonet coupling of the interchangeable lens 100 and the camera 200 and to protrude forward from a neighboring surface thereof. The camera terminal holder 230 is fixed to the camera mount 210. The camera terminal pins 222 are arranged with the same predetermined distances as those of the lens terminal faces 122 to form a line along the arc shape on a terminal arrangement face 232 which is a front end surface of the camera terminal holder 230. A portion between each two camera terminal pins 222 adjacent to each other in the relative rotation direction in the camera terminal holder 230 forms an electric insulation portion that electrically insulates the two camera terminal pins 222.

Although not shown, the camera 200 has a configuration that holds each camera terminal pins 222 movably in its protruding direction (forward), that is, toward the lens terminal face 122 and in an opposite direction thereto (retracting direction) and that biases each camera terminal pin 222 using a biasing member such as a spring in the protruding direction.

The relative rotation of the interchangeable lens 100 and the camera 200 for the bayonet coupling causes the lens terminal faces 122 and the camera terminal pins 222 to slide with respect to each other. Then, in a state where the bayonet coupling is completed (that is, in a state where attachment of the interchangeable lens 100 and the camera 200 is completed, and hereinafter referred to as "an attachment completed state"), among the multiple lens terminal faces 122 and the multiple camera terminal pins 222, each lens terminal face and each camera terminal pin forming a pair (hereinafter also referred to as "paired terminals") make contact with each other. Thereby, an electrical connection between the lens electric circuit 102 and the camera electric circuit is established. A power is supplied to the interchangeable lens 100 from the camera 200 through power supply paired terminals. In addition, various signals and information are communicated between the camera 200 and the interchangeable lens 100 through a plurality of communication paired terminals. Mount detection paired terminals may be provided to detect that the interchangeable lens 100 is attached to the camera 200.

As described above, in the attachment completed state, if the terminal pin does not make contact with the terminal face originally corresponding thereto (that is, forming the paired terminals therewith) because it moves onto the electric insulation portion adjacent thereto, a contact failure occurs. Moreover, if the terminal pin simultaneously makes contact with two terminal faces adjacent to each other in the relative rotation direction, a short circuit occurs. Thus, this embodiment has the following configuration of the lens terminal portion 120.

In the following description, a position in a direction from the lens terminal faces 122 (terminal face side) toward the camera terminal pins 222 (terminal pin side), that is, toward the image plane side in the optical axis direction in the attachment completed state is referred to as "a height". In this embodiment, the terminal arrangement face 132 of the lens terminal holder 130 is formed as a surface orthogonal to the optical axis direction. Moreover, the lens terminal faces 122 are formed as faces having mutually same heights on the terminal arrangement face 132. Furthermore, in the following description, the relative rotation direction (around-optical-axis direction) for the bayonet coupling of the interchangeable lens 100 and the camera 200 is referred to as "a terminal arrangement direction".

Figure 5A:
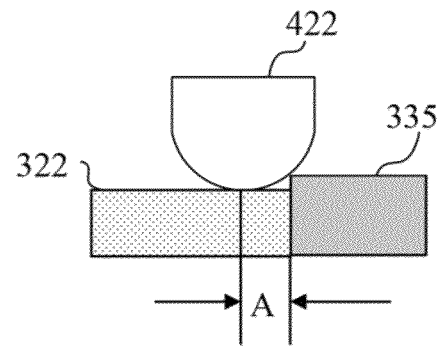
FIGS. 5A, 5B and 5C schematically show configurations of lens terminal portions of comparative examples.
Figure 5B:
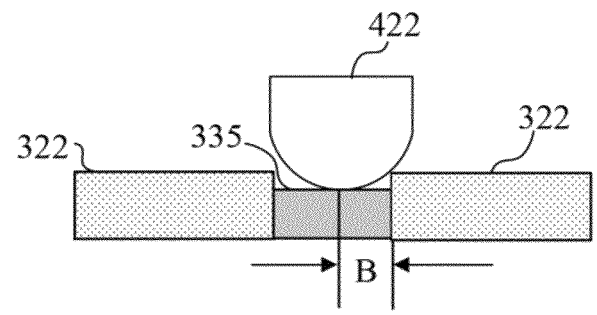
Figure 5C:
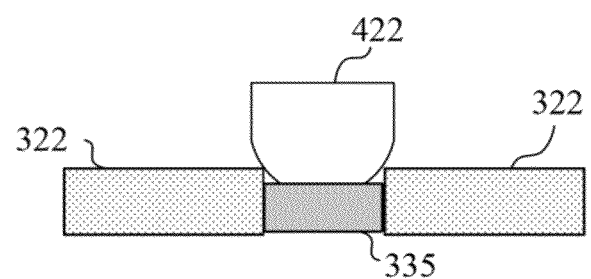

First, FIGS. 5A to 5C show configurations of lens terminal portions in interchangeable lenses as comparative examples (prior arts) with respect to the embodiment. Also in these comparative examples, multiple lens terminal faces 322 are formed as faces having mutually same heights on a terminal arrangement face of a lens terminal holder. In addition, a portion between each two lens terminal faces 322 adjacent to each other in the terminal arrangement direction in the lens terminal holder is formed as an electric insulation portion 335.

In the comparative example shown in FIG. 5A, making a height of the electric insulation portion 335 higher than that of the lens terminal face 322 (that is, causing the electric insulation portion 335 to protrude toward the image plane side) suppresses an occurrence of a contact failure. However, this configuration requires a large marginal width A of the lens terminal face 322 in the terminal arrangement direction in order to prevent the camera terminal pin 422 from moving onto the electric insulation portion 335. Therefore, a size of the entire lens terminal portion increases in the terminal arrangement direction.

In the comparative example shown FIG. 5B, making a height of the lens terminal face 322 lower than that of the electric insulation portion 335 (that is, forming the electric insulation portion 335 as a recessed portion which is recessed from the electric insulation portion 335 to the object side) suppresses an occurrence of the short circuit. However, this configuration requires a large marginal width B of the electric insulation portion 335 in the terminal arrangement direction in order to prevent the camera terminal pin 422 from simultaneously making contact with two adjacent lens terminal faces 322. Therefore, a size of the entire lens terminal portion increases in the terminal arrangement direction. As shown in FIG. 5C, when a diameter of the tip of the camera terminal pin 422 increases due to abrasion in the same configuration as that of FIG. 5B, a larger marginal width B of the electric insulation portion 335 in the terminal arrangement direction is required.

Figure 6A:
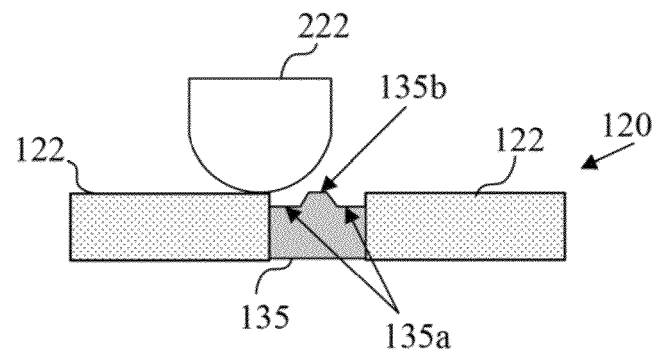
FIGS. 6A, 6B, and 6C schematically show a configuration of a lens terminal portion in the embodiment.
Figure 6B:
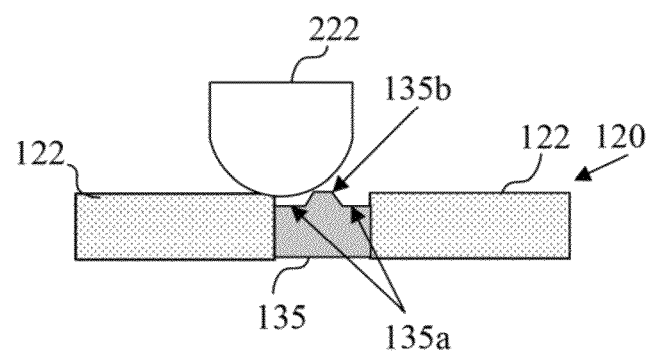
Figure 7:
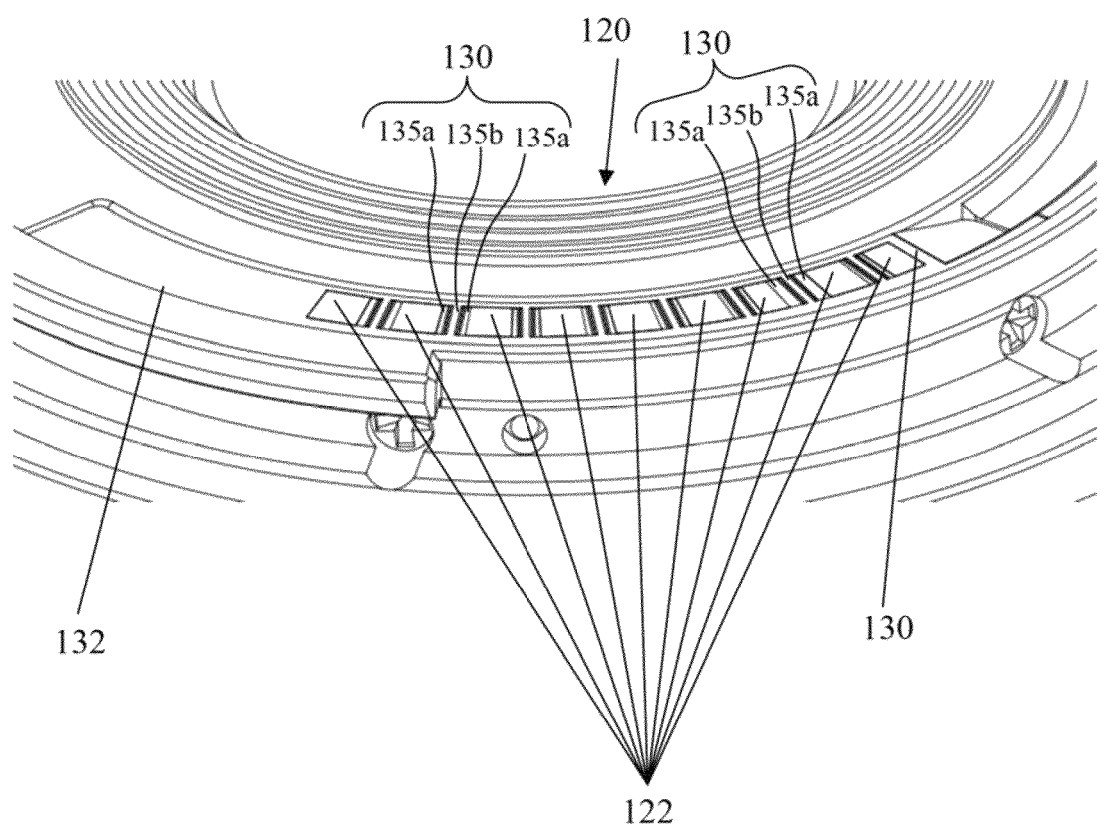
FIG. 7 is a perspective view illustrating a configuration of a lens terminal portion in an Embodiment.

On the other hand, FIGS. 6A, 6B and 7 show a configuration of the lens terminal portion 120 in the embodiment. In the embodiment, the electric insulation portion 135 is provided with two adjacent-to-terminal portions 135a respectively adjacent to the two lens terminal faces 122 disposed on both sides of this electric insulation portion 135 and a convex portion (protruding portion) 135b formed between the two adjacent-to-terminal portions 135a. A height of a top of the convex portion 135b is higher than that of the two adjacent-to-terminal portions 135a. That is, the convex portion 135b protrudes toward the image plane side from the two adjacent-to-terminal portions 135a. In addition, the height of the two adjacent-to-terminal portions 135a is lower than the height of the lens terminal faces 122. Furthermore, the top of the convex portion 135b has a same height as that of the lens terminal faces 122.

In this configuration, as shown in FIG. 6A, the adjacent-to-terminal portions 135a whose height is lower than that of the lens terminal face 122 mostly prevents the camera terminal pin 222 from moving onto the electric insulation portion 135, which suppresses the contact failure. Therefore, it is unnecessary to provide the marginal width A shown in FIG. 5A in the lens terminal face 122. Accordingly, the size of the lens terminal portion 120 in the terminal arrangement direction can be reduced as compared with the configuration shown in FIG. 5A. For example, a width of the electric insulation portion 135 in the terminal arrangement direction can be made much smaller than an outer diameter of the camera terminal pin 222.

Furthermore, even if the camera contact pin 222 moves onto the convex portion 135b, the camera contact pin 222 does not simultaneously make contact with the two adjacent lens terminal faces 122 arranged with the electric insulation portion 135 interposed therebetween. Therefore, it is unnecessary to provide the marginal width B shown in FIG. 5B in the electric insulation portion 135. Accordingly, the size of the lens terminal portion 120 in the terminal arrangement direction can be reduced as compared with the configuration shown in FIG. 5B.

Figure 6C:
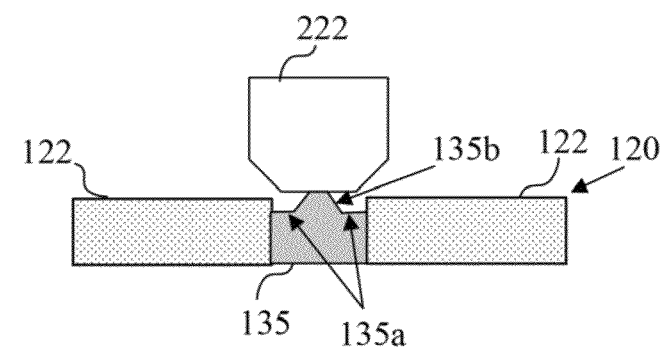

In the electric insulation portion 135, the height of the convex portion 135b (top thereof) may be made higher than that of the lens terminal face 122 as shown in FIG. 6C. In this configuration, even if the camera terminal pin 222 is abraded and thereby a diameter of its tip increases, the camera contact pin 222 that has moved onto the convex portion 135b hardly simultaneously makes contact with the two adjacent lens terminal faces 122 arranged with the electric insulation portion 135 interposed therebetween. Thus, as described with reference to FIG. 6B, it is unnecessary to provide the marginal width B in the electric insulation portion 135 and thereby the size of the lens terminal portion 120 in the terminal arrangement direction can be reduced.

Moreover, in the electric insulation portion 135, the height of the two adjacent-to-terminal portions 135a may be made same as that of the lens terminal faces 122. In this case, even though it is necessary to provide the marginal width A shown in FIG. 5A in the lens terminal faces 122, the marginal width A can be reduced by widths of the two adjacent-to-terminal portions 135a in the terminal arrangement direction. Therefore, the size of the lens terminal portion 120 in the terminal arrangement direction can be reduced as compared with the configuration shown in FIG. 5A.

As described in the foregoing, this embodiment enables reduction of the size (length) of the lens terminal portion 120 in the terminal arrangement direction as compared with the conventional configurations. In addition, it is not necessary to provide a large height difference in the lens terminal portion as in the configuration disclosed in Japanese Patent Laid-Open No. 02-103522. Accordingly, this embodiment makes it possible to avoid occurrence of the contact failure and the short circuit due to displacement, abrasion and the like of the camera contact pin 222 without increasing the size of the lens terminal portion 120.

Although this embodiment described the case where the lens mount 110 of the interchangeable lens 100 is directly attached to (coupled with) the camera mount 210 of the camera 200, an intermediate adapter (optical apparatus, not shown) such as an extender or a mount conversion adapter may be coupled to the camera mount 210 and the lens mount 110 may be coupled to a mount provided in the intermediate adapter. Moreover, although this embodiment described the interchangeable lens 100 as the optical apparatus accessory, alternative embodiments of the present invention include optical apparatus accessories other than the interchangeable lens, such as the above-mentioned intermediate adapter or an external flash attached to the camera.

Furthermore, although this embodiment described the interchangeable lens as the optical apparatus accessory is attached to or detached from the camera as the optical apparatus by the relative rotation thereof, attachment and detachment of the optical apparatus accessory and the optical apparatus does not necessarily need to be performed by the relative rotation thereof, and may be performed by a relative movement thereof.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2012-201267, filed on Sep. 13, 2012, which is hereby incorporated by reference herein in its entirety.

What is claimed is:

1. An optical apparatus accessory detachably attachable to an optical apparatus by relative movement with the optical apparatus, the accessory comprising:
multiple terminal faces arranged in a direction of the relative movement and allowed to make contact with multiple terminal pins provided in the optical apparatus to establish an electric contact between the accessory and the optical apparatus; and
electric insulation portions provided between each two adjacent terminal faces among the multiple terminal faces, wherein, when a position in a direction from the terminal face toward the terminal pin in a state where attachment of the accessory and the optical apparatus is completed is defined as a height, the multiple terminal faces are arranged at a same height, each of the electric insulation portions includes (a) two adjacent-to-terminal portions respectively adjacent to the two adjacent terminal faces and (b) a convex portion provided between the two adjacent-to-terminal portions and having a higher height than that of the two adjacent-to-terminal portions, the two adjacent-to-terminal portions have a height same as or lower than that of the terminal faces,
and the convex portion has a height same as or higher than that of the terminal faces.

2. An accessory according to claim 1, wherein the accessory includes an optical system, and
wherein a surface on which the terminal faces are arranged is orthogonal to an optical axis direction of the optical system.

3. An accessory according to claim 1, wherein the accessory is provided with an accessory mount to be coupled with an optical apparatus mount provided with the optical apparatus by relative rotation with the optical apparatus mount, and
wherein the multiple terminal faces are arranged in the accessory mount in a direction of the relative rotation.

4. An accessory according to claim 1, wherein a width of the electric insulation portion in the direction of the relative movement is smaller than an outer diameter of the terminal pin.

5. An accessory according to claim 1, wherein the accessory is an interchangeable lens detachably attachable to an image pickup apparatus as the optical apparatus.

6. An optical apparatus to which an optical apparatus accessory is detachably attachable by relative movement with the accessory, the accessory comprising:
multiple terminal faces arranged in a direction of the relative movement and allowed to make contact with multiple terminal pins provided in the optical apparatus to establish an electric contact between the accessory and the optical apparatus; and
electric insulation portions provided between each two adjacent terminal faces among the multiple terminal faces, wherein, when a position in a direction from the terminal face toward the terminal pin in a state where attachment of the accessory and the optical apparatus is completed is defined as a height, the multiple terminal faces are arranged at a same height, each of the electric insulation portions includes (a) two adjacent-to-terminal portions respectively adjacent to the two adjacent terminal faces and (b) a convex portion provided between the two adjacent-to-terminal portions and having a higher height than that of the two adjacent-to-terminal portions, the two adjacent-to-terminal portions have a
height same as or lower than that of the terminal faces and the convex portion has a height same as or higher than that of the terminal faces, and
wherein the apparatus has a configuration which holds the multiple terminal pins such that each terminal pin is movable in a direction of protruding toward the terminal face and in an opposite direction thereto and which biases each terminal pin in the direction of protruding toward the terminal face.

7. An optical apparatus according to claim 6, wherein the optical apparatus is an image pickup apparatus to which an interchangeable lens is detachably attachable.

* * * * *